US009456357B2

(12) United States Patent
Vitek

(10) Patent No.: US 9,456,357 B2
(45) Date of Patent: Sep. 27, 2016

(54) ADAPTIVE ANTENNA PATTERN MANAGEMENT FOR WIRELESS LOCAL AREA NETWORKS

(75) Inventor: Clark Alan Vitek, Vancouver, WA (US)

(73) Assignee: Aruba Networks, Inc., Sunnyvale, CA (US)

( * ) Notice: Subject to any disclaimer, the term of this patent is extended or adjusted under 35 U.S.C. 154(b) by 314 days.

(21) Appl. No.: 13/560,816

(22) Filed: Jul. 27, 2012

(65) Prior Publication Data

US 2014/0029450 A1 Jan. 30, 2014

(51) Int. Cl.
*H04W 4/00* (2009.01)
*H04B 1/00* (2006.01)
*H04W 24/02* (2009.01)
*H04W 16/28* (2009.01)
*H04W 16/20* (2009.01)

(52) U.S. Cl.
CPC ............ *H04W 24/02* (2013.01); *H04W 16/28* (2013.01); *H04W 16/20* (2013.01)

(58) Field of Classification Search
CPC .... H04W 64/00; H04W 16/20; H04W 16/28
USPC ........... 370/252, 328; 455/63.4, 456.1, 562.1
See application file for complete search history.

(56) References Cited

U.S. PATENT DOCUMENTS

| | | | |
|---|---|---|---|
| 5,890,067 A * | 3/1999 | Chang et al. | 455/446 |
| 7,324,605 B2 | 1/2008 | Maltsev et al. | |
| 7,421,012 B1 | 9/2008 | Feng et al. | |
| 7,511,663 B2 | 3/2009 | Wang et al. | |
| 7,737,890 B2 | 6/2010 | Wang et al. | |
| 8,223,072 B2 | 7/2012 | Ponnuswamy | |
| 2004/0177306 A1 | 9/2004 | Hiraki | |
| 2004/0196822 A1 | 10/2004 | Proctor, Jr. | |
| 2005/0013391 A1 | 1/2005 | Boer et al. | |
| 2005/0075142 A1 | 4/2005 | Hoffmann et al. | |
| 2005/0157671 A1 | 7/2005 | Sugitani | |
| 2005/0285803 A1 | 12/2005 | Iacono et al. | |
| 2006/0154624 A1 | 7/2006 | Suzuki | |
| 2006/0209978 A1 | 9/2006 | Jungnickel et al. | |
| 2006/0270412 A1 * | 11/2006 | Willins et al. | 455/445 |
| 2007/0064706 A1 | 3/2007 | Fontaine et al. | |
| 2007/0253324 A1 | 11/2007 | Ma et al. | |
| 2008/0051097 A1 | 2/2008 | Kwon | |

(Continued)

OTHER PUBLICATIONS

Doherty Jr. et al., "Microsemi-Watertown:The Pin Diode Circuit Designers' Handbook", Microsemi Corporation, 1998, 137 pages.

*Primary Examiner* — Dang Ton
*Assistant Examiner* — Ryan Kavleski
(74) *Attorney, Agent, or Firm* — Brooks, Cameron & Huebsch, PLLC

(57) ABSTRACT

The present disclosure discloses a network device and/or method for adaptive antenna pattern management for wireless local area networks. A network device comprising an adaptive antenna receives a coverage area description and a wireless coverage objective for a wireless network. The network device also scans a plurality of channels in a plurality of directions to detect signal levels from one or more other network devices in the wireless network. The network device can then coordinate wireless signal coverage with the one or more other network devices based at least on the coverage area description, the wireless coverage objective, and the detected signal levels. Specifically, the network device may accomplish such coordination by switching or reshaping the adaptive antenna patterns based on adaptive antenna patterns of other network devices in the wireless network.

19 Claims, 10 Drawing Sheets

(56) References Cited

U.S. PATENT DOCUMENTS

| | | | |
|---|---|---|---|
| 2008/0274748 A1* | 11/2008 | Lastinger et al. | ............ 455/450 |
| 2009/0041148 A1 | 2/2009 | Li et al. | |
| 2009/0060088 A1 | 3/2009 | Callard et al. | |
| 2009/0150537 A1 | 6/2009 | Fanson | |
| 2009/0232122 A1 | 9/2009 | Suda et al. | |
| 2010/0027603 A1 | 2/2010 | Beadle et al. | |
| 2010/0279616 A1* | 11/2010 | Jin et al. | ......................... 455/62 |
| 2011/0032953 A1 | 2/2011 | Lee et al. | |
| 2011/0065448 A1* | 3/2011 | Song et al. | ................ 455/452.2 |
| 2013/0273934 A1* | 10/2013 | Meredith et al. | .......... 455/456.1 |

* cited by examiner

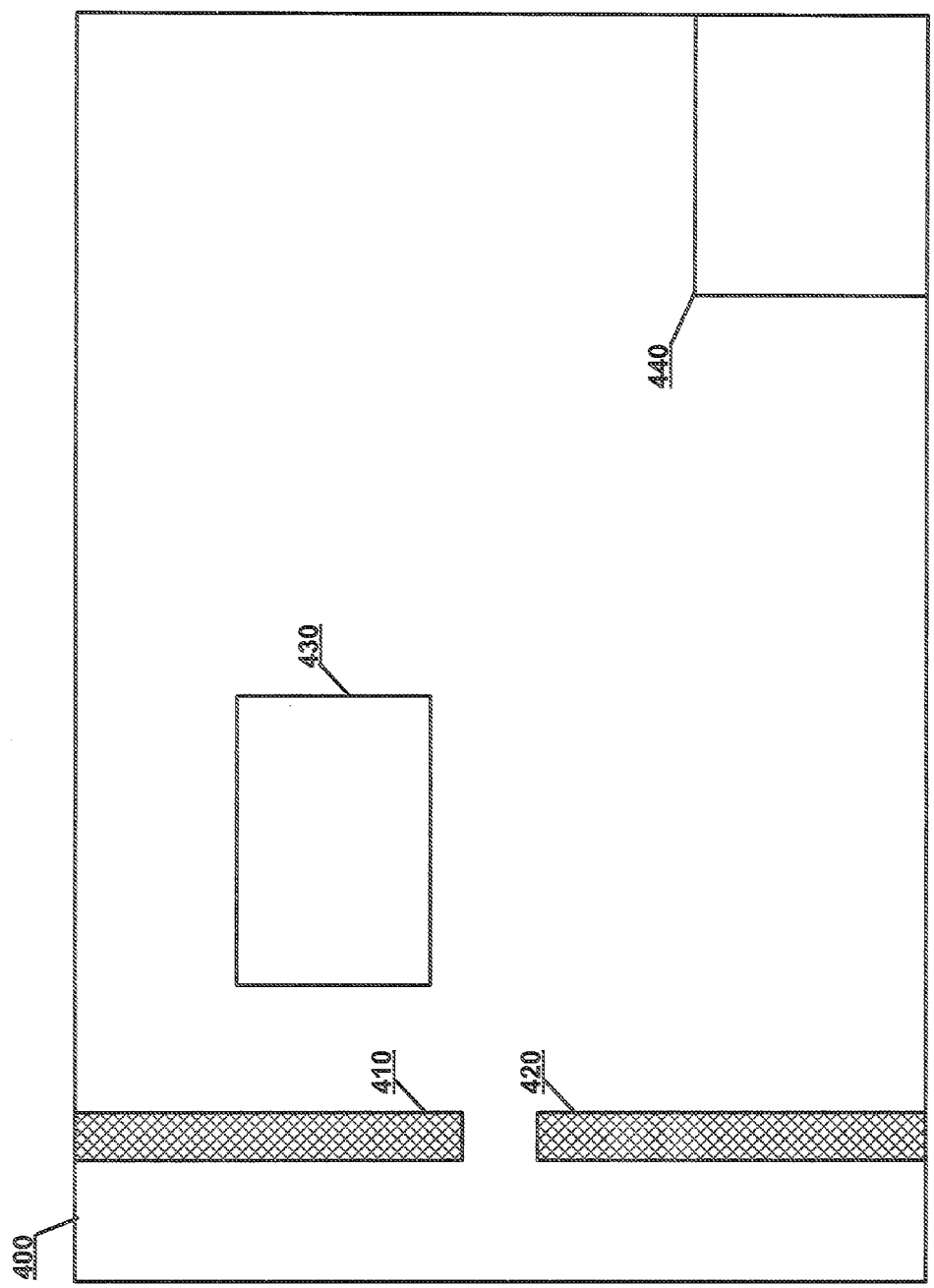

ADAPTIVE ANTENNA PATTERN MANAGEMENT FOR WIRELESS LOCAL AREA NETWORKS

FIELD

The present disclosure relates to antenna systems for wireless devices. In particular, the present disclosure relates to smart antenna systems that can provide adaptive antenna pattern management for wireless local area networks (WLAN).

BACKGROUND

Wireless digital networks, such as networks operating under the current Electrical and Electronics Engineers (IEEE) 802.11 standards, are spreading in their popularity and availability. Present antenna systems for wireless local area networks (WLAN), e.g., under IEEE 802.11 standards, can be categorized by two general types.

The first general type includes passive antennas. Passive antennas typically have no ability to actively alter, switch, or reshape their antenna pattern. Moreover, a passive antenna is usually connected to a radio access point, and thus its antenna pattern and coverage shape are fixed by the mechanical installation of the radio access point. In some cases, the mechanical installation may provide some flexibility in directing the antenna pattern to a desired coverage area (also known as "azimuth and elevation adjustment"), for example, by electrically adjusting mechanical or motorized mechanical mounts. Nevertheless, once the mechanical movement is fixed, the resulting antenna pattern and coverage area of the radio access point and the passive antenna combination usually does not change.

The other general type of antenna systems includes active antennas. Active antennas typically have the ability to electrically reshape the radiated pattern of the antenna, for example, by electrically switching the elements that are connected to the access point radio. The active antennas can further be categorized into two sub-types: diversity antenna arrays, and smart antenna arrays. In the case of diversity antenna arrays, the active element may be selected based on various methods, which may include received signal strength or communication error rates above and/or below a certain threshold. For example, in a radio access point having diversity antenna arrays, when a predetermined threshold is crossed, the radio will switch to another antenna of the radio access point. Typically, in the case of diversity antenna arrays, the antenna system is typically designed to provide the same coverage pattern from multiple passive antennas. Therefore, the antennas are simply switched one at a time to improve the radio communication link based on the diversity selection method.

By contrast, the other type of active antenna includes smart antenna arrays. The smart antenna arrays include an array of antennas or other radiating elements that can be switched to reshape the direction, pattern, and gain characteristics of the overall radiating structure. In the case of smart antenna arrays, the pattern and gain shaping selection can often be based on ways that are intended to dynamically reshape the antenna pattern to direct more signals toward the other side of the radio link. Because radio waves are reciprocal, dynamically reshaping the antenna pattern towards the opposite side of the radio link can improve the communication link quality in both the transmitting direction and the receiving direction.

The process generally described as directing radio signals toward the desired coverage area often is referred to as "pattern" or "coverage" management. Besides improving the radio link in the desired direction, pattern and coverage management can also be used to direct signals away from undesired directions for interference mitigation purposes and/or improved wireless security. For example, it may be desired that an office building provides WLAN signals only inside the office building with minimal WLAN signals available in the parking lot of the next building, which presumably is an unsecured area where network monitoring ("sniffing") or active wireless network attacks ("hacking") attempts can be more easily initiated against the private wireless network. This will become a problem for passive antennas, because passive antennas have no ability to reshape their antenna patterns to improve the signal in the desired coverage direction. Likewise, the above example can become problematic for active diversity antenna arrays as well, because active diversity arrays are simply a switched group of passive antennas, e.g., switching one passive antenna at a time and not in combination.

Smart antennas can be used for pattern and coverage management, but one problem with conventional smart antenna systems is that the selection methods are based on analysis of individual radio level, such as, a signal strength and an incoming signal direction, and not based on any high level coordination of multiple radios.

In a typical modern WLAN deployment, for network capacity reasons, it is not unusual to have many access points operating in close proximity to each other. The conventional smart antenna systems have the ability to drastically reshape the pattern of an individual radio and even to manage pattern shaping in real time to support multiple links in different directions, but these smart antenna systems do not have any ability to act in a coordinated fashion to achieve overall facility coverage and pattern management.

BRIEF DESCRIPTION OF THE DRAWINGS

The present disclosure may be best understood by referring to the following description and accompanying drawings that are used to illustrate embodiments of the present disclosure.

FIG. 4A shows an exemplary coverage area description according to embodiments of the present disclosure.

DETAILED DESCRIPTION

Figure 1A:
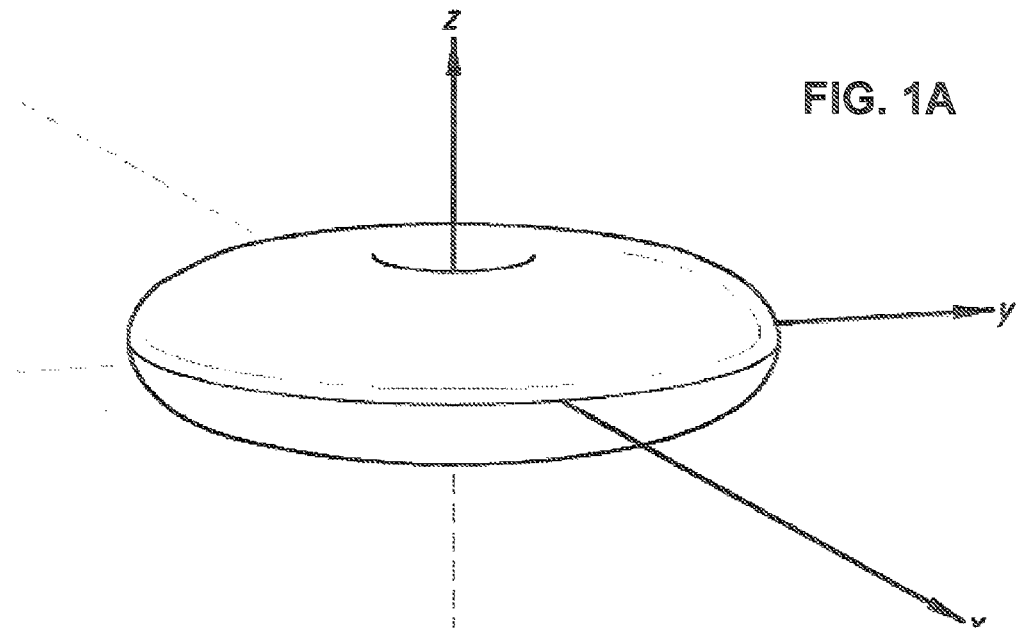
FIG. 1A shows an exemplary wireless antenna pattern according to embodiments of the present disclosure.

In the following description, several specific details are presented to provide a thorough understanding. While the context of the disclosure is directed to adaptive antenna pattern management in wireless local area network, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to antenna systems for wireless devices in general, and smart antenna systems that can provide adaptive antenna pattern management for wireless local area networks (WLAN) in particular.

With the solution provided herein, the disclosed network device having an adaptive antenna can receive a coverage area description and a wireless coverage objective for a wireless network, scan a plurality of channels in a plurality of directions to detect signal levels from one or more other network devices in the wireless network, and coordinate wireless signal coverage with the one or more other network devices based at least on the coverage area description, the wireless coverage objective, and the detected signal levels.

In some embodiments, the disclosed network device coordinates wireless signal coverage by switching the adaptive antenna pattern or reshaping the adaptive antenna pattern.

In some embodiments, the disclosed network device further determines whether wireless coverage corresponding to a respective area meets the wireless coverage objective. If the wireless coverage corresponding to the respective area does not meet the wireless coverage objective, the disclosed network device coordinates the wireless signal coverage with the one or more other network devices in the wireless network.

In some embodiments, the disclosed network device receives a configuration for an overlapping parameter. If overlapping is configured by the overlapping parameter, the disclosed network device coordinates with the other network devices in the wireless network to provide overlapped wireless signal coverage. If, on the other hand, non-overlapping is configured by the overlapping parameter, the disclosed network device coordinates with the other network devices in the wireless network to avoid overlapped wireless signal coverage.

In some embodiments, the disclosed network device coordinates the wireless signal coverage based on one or more of:
a user input;
an indicated coverage area;
a coverage objective;
a wireless network device installation method; and
a wireless signal strength.

In some embodiments, network devices in the wireless network are divided into multiple groups. Moreover, the disclosed network device can coordinate antenna radiated patterns of adaptive radios on the network devices across multiple groups at different hierarchical level.

In some embodiments, the disclosed network device can coordinate the radiated antenna patterns in a horizontal direction, a vertical direction, an angled direction, or a combination thereof.

In some embodiment, the disclosed network device can scan in a first direction to detect a first signal strength level from a wireless client device at a first location in the wireless network. Then, to coordinate the wireless signal coverage, the disclosed network device further scans in a second direction corresponding to a changed antenna pattern to detect a second signal strength level from the wireless client device at a second location in the wireless network.

In some embodiments, the changed antenna pattern includes at least one of a switched new radiated antenna pattern and a reshaped existing radiated antenna pattern.

In some embodiments, the disclosed network device can determine one or more characteristics of the wireless network based on the first signal strength level and the second signal strength level.

Antenna Patterns

An antenna generally refers to a conductive structure designed to couple or radiate electromagnetic energy. In bidirectional radio frequency communication systems, the antenna may be used to both transmit and receive electromagnetic energy. A typical antenna radiates radio frequency (RF) energy around it as if a doughnut shape is placed down over the axis of the antenna. This type of antenna is often referred to as "omnidirectional antenna," because the antenna radiates in all directions around the plane perpendicular to the antenna shaft. On the other hand, a high-gain or directional antenna is constructed such that the RF energy is radiated in a differently shaped 3-dimensional volume. For example, a high-gain antenna may flatten the doughnut, and thus causing more energy to be directed to the sides and less energy to be directed towards the top and the bottom. Moreover, directional antenna may add elements of the antenna construction that reflect or direct the outwardly propagating RF energy predominantly in one or more directions rather than in all directions as in an omnidirectional antenna. For example, if all signals going out to the left of an antenna are reflected to the right, then the effective net result would be that twice the RF energy would be sent out towards the right. Different types of antennas offer different ways of shaping the RF signal energy, and therefore are able to focus the RF signal energy in a desired manner.

Figure 1B:
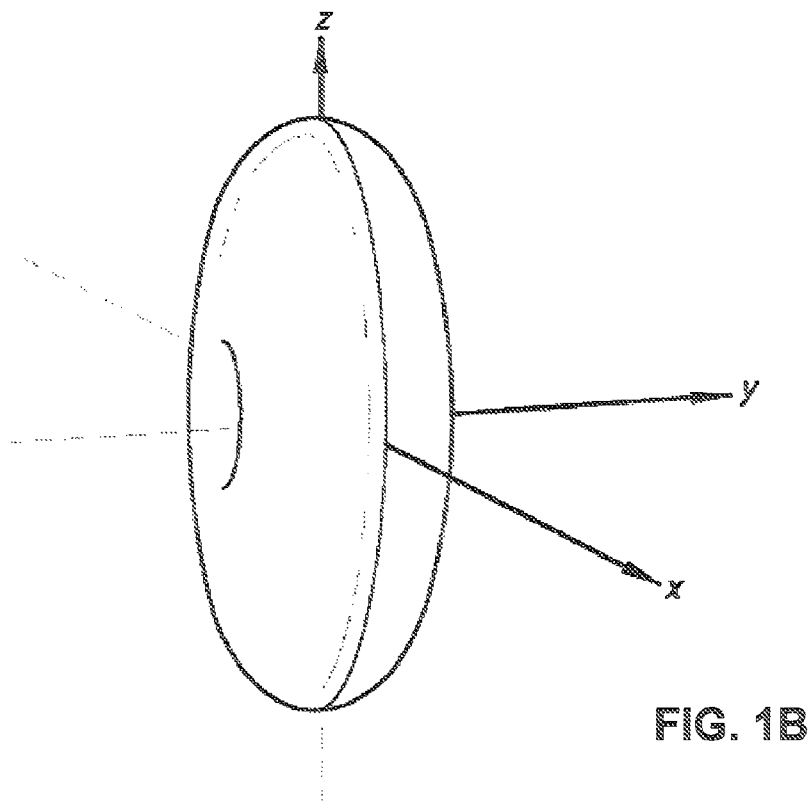
FIG. 1B shows another exemplary wireless antenna pattern according to embodiments of the present disclosure.

Typically, the signal characteristics of an antenna are represented with a special graph called an antenna pattern graph. FIG. 1A shows an exemplary antenna pattern graph. In this example, an omnidirectional antenna spreads out RF energy equally in all directions on a horizontal plane. As another example, FIG. 1B shows another exemplary antenna pattern graph in which the omnidirectional antenna spreads out RF energy equally in all directions on a vertical plane.

Figure 2B:
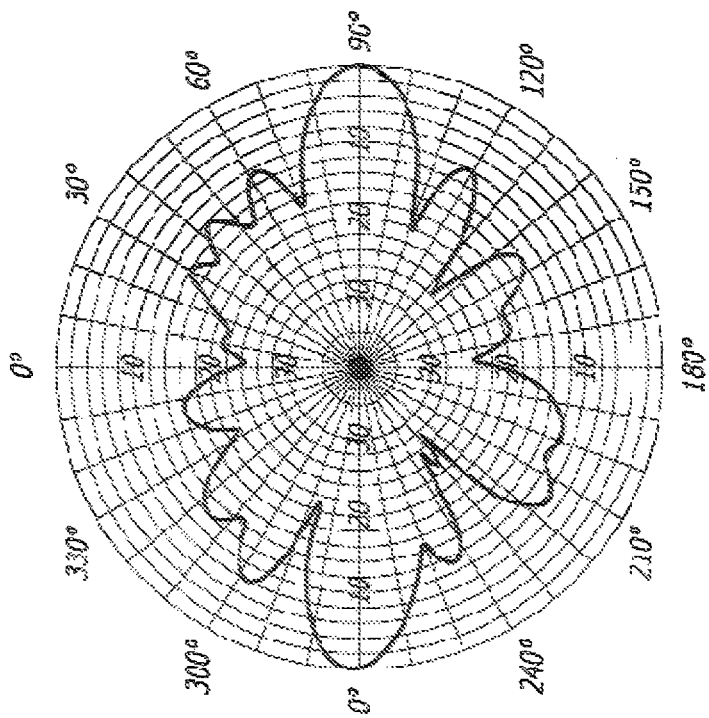
FIGS. 2A-2B show another exemplary wireless antenna pattern according to embodiments of the present disclosure.
Figure 2A:
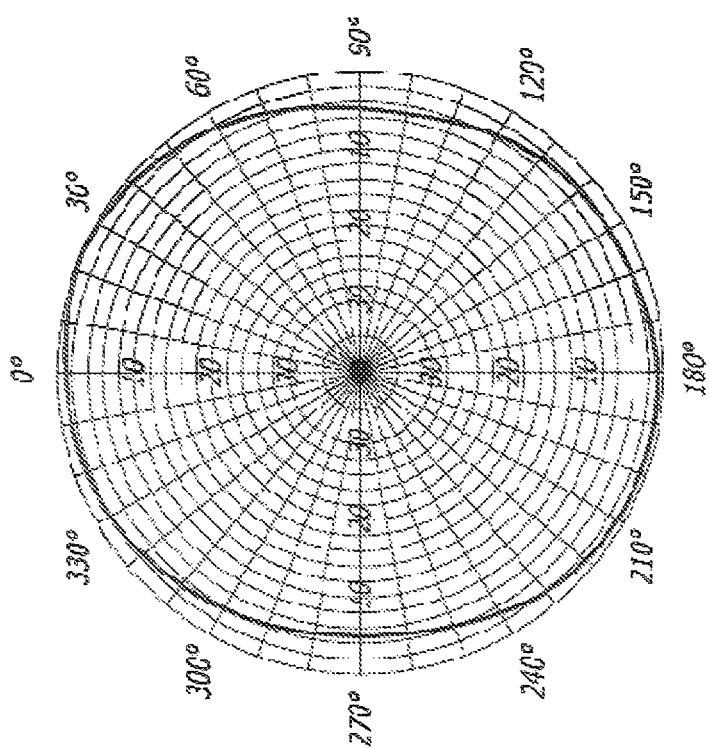

FIGS. 2A-2B show another exemplary antenna pattern that is asymmetric. Specifically, FIG. 2A shows an azimuth plane view of this exemplary antenna pattern. FIG. 2B shows an elevation plane view of this exemplary antenna pattern. In displaying coverage based on antenna characteristics, antenna pattern information may be obtained from measurements by modeling the antenna, or may be provided by antenna suppliers. Such antenna information is typically presented as a series of two-dimensional plots in logarithmic units such as dBi (decibels above isotropic) or dBd (decibels above dipole). For example, in FIGS. 2A-2B, the outer circle is the 0 dB reference line. The circles labeled 10 are 10 dB below the 0 dB reference, a factor of 10 decrease in power. The circles labeled 20 are 20 dB below the 0 dB reference, a factor of 100 decrease in power. Moreover, the azimuth plane view illustrated in FIG. 2A provides antenna pattern information, such as the maximum antenna gain, the direction of maximum gain, and the gain relative to the maximum in any horizontal direction. Similarly, the elevation plane view illustrated in FIG. 2B provides antenna pattern information, such as the maximum antenna gain, the direction of maximum gain, and the gain relative to the maximum in any vertical direction. Accordingly, a radio coverage area can typically be determined based on a combination of the antenna pattern information gathered from the azimuth plane view and the elevation plane view. For example, the angles at which the antenna pattern is 3 dB below the maximum represent a factor of 2 or a 50% reduction in power. These angles are typically referred to as the "−3 dB beam width," and the area contained in this beam width may be referred to as the "coverage area."

Figure 3A:
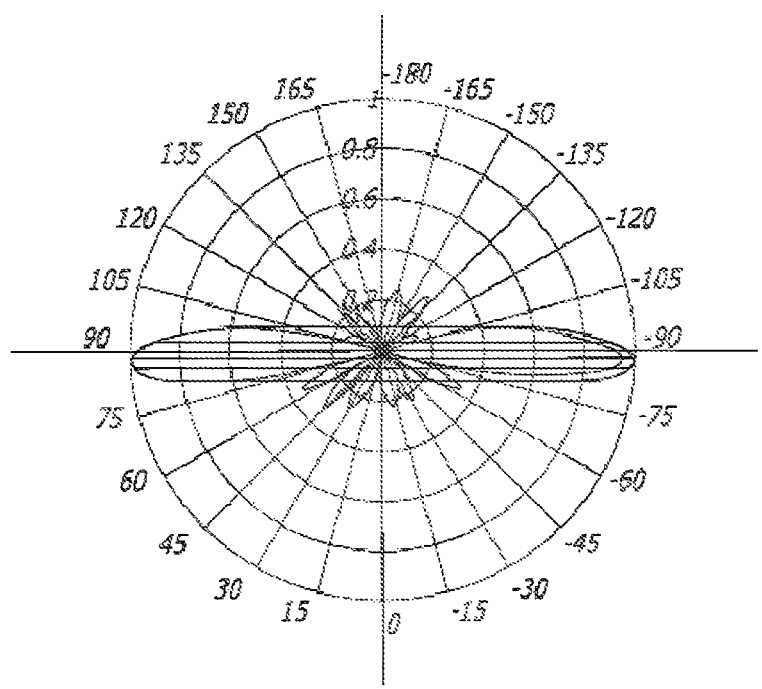
FIGS. 3A-3B show another exemplary wireless antenna pattern according to embodiments of the present disclosure.
Figure 3B:
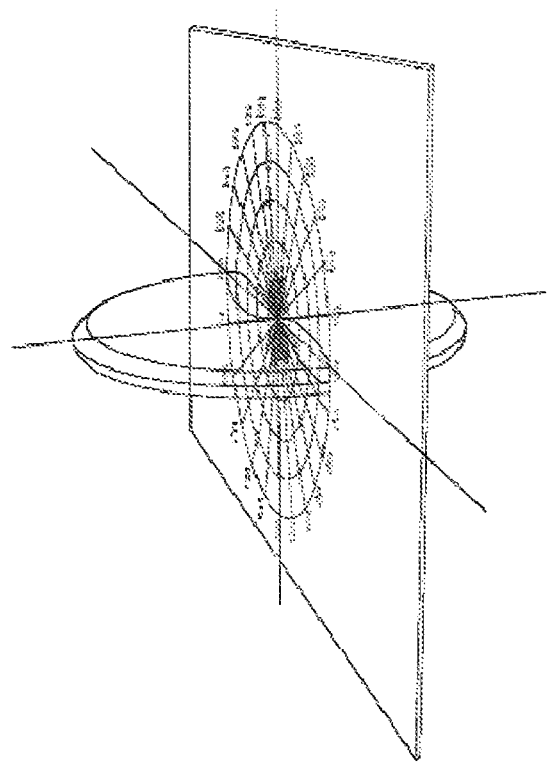

FIGS. 3A-3B show another exemplary antenna pattern that is linearly scaled. In FIG. 3A, the antenna radiated pattern is plotted on a linear scale (as opposed to a logarithmic scale as shown in FIGS. 2A-2B). The linear scale view usually emphasizes the main radiation beam and suppresses side lobes, and thus is preferred when radiation level of the main radiation beam is important. On the other hand, the logarithmic scale is often preferred when the radiation levels of the side lobes are important. In addition, the logarithmic scale may be modified by compressing very low-level (e.g., greater than 30 dB) side lobes towards the center of the pattern, and thus emphasizing the shape of the major beam.

Beamforming is often utilized as a specialized method of radio-frequency (RF) transmission used within access points (APs). Beamforming facilitates controlling and manipulating wireless transmissions to improve the signal reception by each client and the throughput. APs that support beamforming can focus the RF energy they radiate directly at a receiving client device, for example, by amplifying and phasing the signals using a wireless chip, by physically focusing the energy using a smart antenna, or by a specially designed software control module. Moreover, beamforming can deliver predictable throughput at longer ranges, and thereby provide sustained performance when the client device is in motion. By focusing transmissions toward a client device, beamforming techniques based on the client device's location avoid wasted energy and eliminate unnecessary RF interference in other directions. In some embodiments, beamforming can be performed on a per-user basis, or on a per packet basis for each distinct client. Here, a packet generally refers to any formatted unit of data in a series of bits, bytes, or characters that can be transmitted on a circuit switched network.

Note that, although only a few antenna patterns are described herein, a smart antenna often can be adapted to provide a variety of different antenna coverage patterns. The present disclosure is not limited to or dependent upon any specific antenna type or antenna patterns.

Adaptive Radio Management

WLAN controlling plane can provide adaptive radio management for a WLAN by coordinating the coverage and pattern of multiple access point radios. Specifically, adaptive radio management (ARM) mechanisms can coordinate the following parameters to increase overall facility coverage management:

(1) The channel frequency of operation of individual radios is coordinated to minimize interference between access points that are located near each other, and (2) The output power level is coordinated to raise or lower transmit power to manage interference and the coverage area size of individual radio and antenna combinations.

Using adaptive radio management (ARM) for channel and power coordination is especially useful in dense radio deployments, where several access points must operate within coverage range of each other. In addition, a control-plane mechanism can be added to allow a network administrator to design and monitor the resulting coverage, and to manage the radio channel and power settings of multiple access points. Therefore, a radio coverage graph may be overlaid upon a facility floor plan, which may include visualization of the actual floor plan the facility as well as dynamically determined radio coverage areas of multiple network devices.

For purposes of illustration only, FIG. 4A shows an exemplary facility floor plan according to embodiments of the present disclosure. In this example, building 400 includes physical barriers 410 and 420 with an opening in-between, an enclosed central area 430, and an enclosed corner area 440. Note that, although an indoor facility floor plan is provided in this example, the adaptive antenna management mechanism disclosed herein can be utilized in any indoor, outdoor, or hybrid/combined wireless networks. Also, the floor plan may be in either a two-dimensional format or a three-dimensional format. The floor plan may be stored at a network device or any other network storage that the network device can retrieve information from.

Figure 4B:
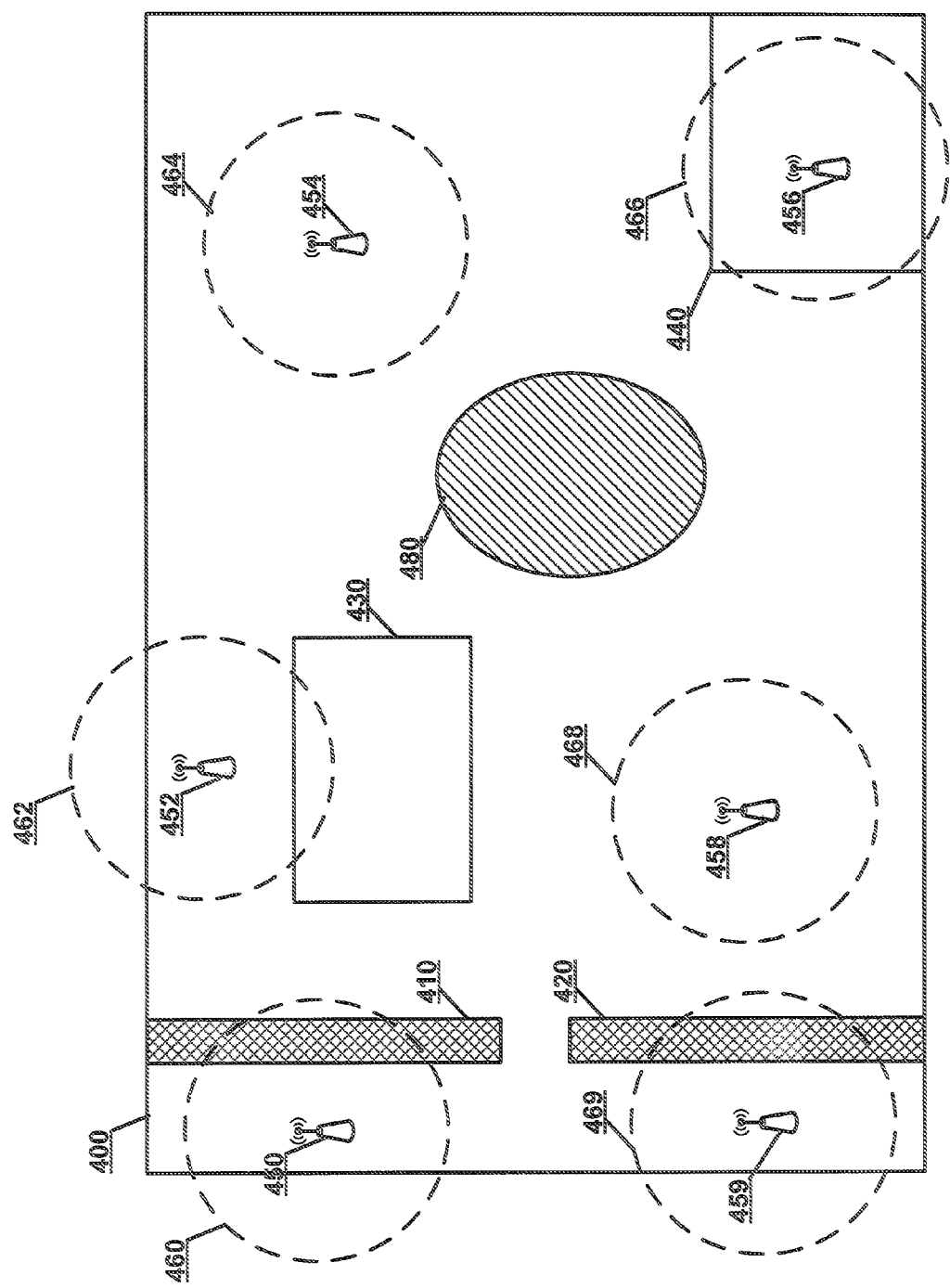
FIG. 4B shows exemplary initial radio coverage overlaid on a coverage area description according to embodiments of the present disclosure.

FIG. 4B shows exemplary initial radio coverage overlaid on the facility floor plan illustrated in FIG. 4A. FIG. 4B includes a plurality of network devices, such as access point 450, access point 452, access point 454, access point 456, access point 458, and access point 459. For illustration purposes, assuming that, access point 450 has one or more antennas with a wireless coverage area encircled by area 460; access point 452 has one or more antennas with a wireless coverage area encircled by area 462; access point 454 has one or more antennas with a wireless coverage area encircled by area 464; access point 456 has one or more antennas with a coverage area encircled by area 466; access point 458 has a wireless coverage area encircled by area 468; and, access point 459 has a wireless coverage area encircled by area 469, etc. In addition, area 480 indicating an area in which an improved wireless coverage is desired can also be overlaid on the facility floor plan.

In some embodiments, a user interface may be provided to a network administrator to input and configure the location of the access points, and/or the area(s) and/or space(s) for improved wireless coverage. In other embodiments, a network device, such as a wireless network controller, may communicate with a plurality of active antennas on multiple network devices to dynamically determine their radiated patterns at real-time. Furthermore, the network device may also dynamically identify any area desirable for improve wireless coverage based on a combination of the active antenna radiated patterns and a pre-defined coverage objective. The pre-defined coverage objective may include, for example, a signal level, an overlapping parameter measurement, an interference measurement, etc.

Therefore, the network device such as the wireless network controller, will have one or more of the following information loaded by the user or automatically determined:

1) The facility size and shape and the size and shape of the desired coverage areas. This is typically displayed against a floor plan or map of the facility;

2) The location of the access points relative to each other and relative to the facility plans; and 3) The installation/mounting information of the access point (ceiling mounted, wall mounted, pillar mounted, and height above the floor) relative to the facility plan and desired coverage areas.

Active antennas in access points 450-459 typically have the ability to switch or reshape their radiated patterns in a number of different ways. For example, in some embodiments, the active antennas may increase or decrease the gain in the horizontal plane and/or the vertical plane. In some embodiments, the active antennas may increase or decrease the pattern beam width in the horizontal plane and/or the vertical plane. In some embodiments, the active antennas may increase or decrease the front-to-back ratio, or main-lobe-to-side-lobe ratio, or other typical parameters used to express the three-dimensional radiated patterns. In some embodiments, an active antenna may change or alter the radiating polarization of the antenna, which is the orientation of the electric field within the radiated pattern and may include horizontal, vertical, circular, or dual polarization.

Gain and the −3 dBr beam widths stated in the horizontal (or azimuth) and vertical (or elevation) planes are typically utilized as measures of the shape of an antenna radiated pattern. As previously described, beam width can also be stated as a value relative to the maximum gain in dBr, such as −6 dBr, 10 dBr, etc., or as an absolute value of gain in dBi.

The ability of the smart antenna to actively reshape the antenna pattern in combination with the facility plan and location information in a network device allows the network device to coordinate the pattern shape of each individual smart antenna. This provides the network administrator with the ability to coordinate the pattern management of multiple radio and antenna combinations, and to direct signals to the desired coverage area and away from undesired coverage areas in a coordinated manner, and thereby improving wireless signal coverage and reducing signal interferences. Furthermore, the antenna pattern can be adjusted using a common access point and active antenna hardware platform at any time from a management interface to reshape the coverage using one or more adaptive radio and smart antenna combinations.

Figure 4C:
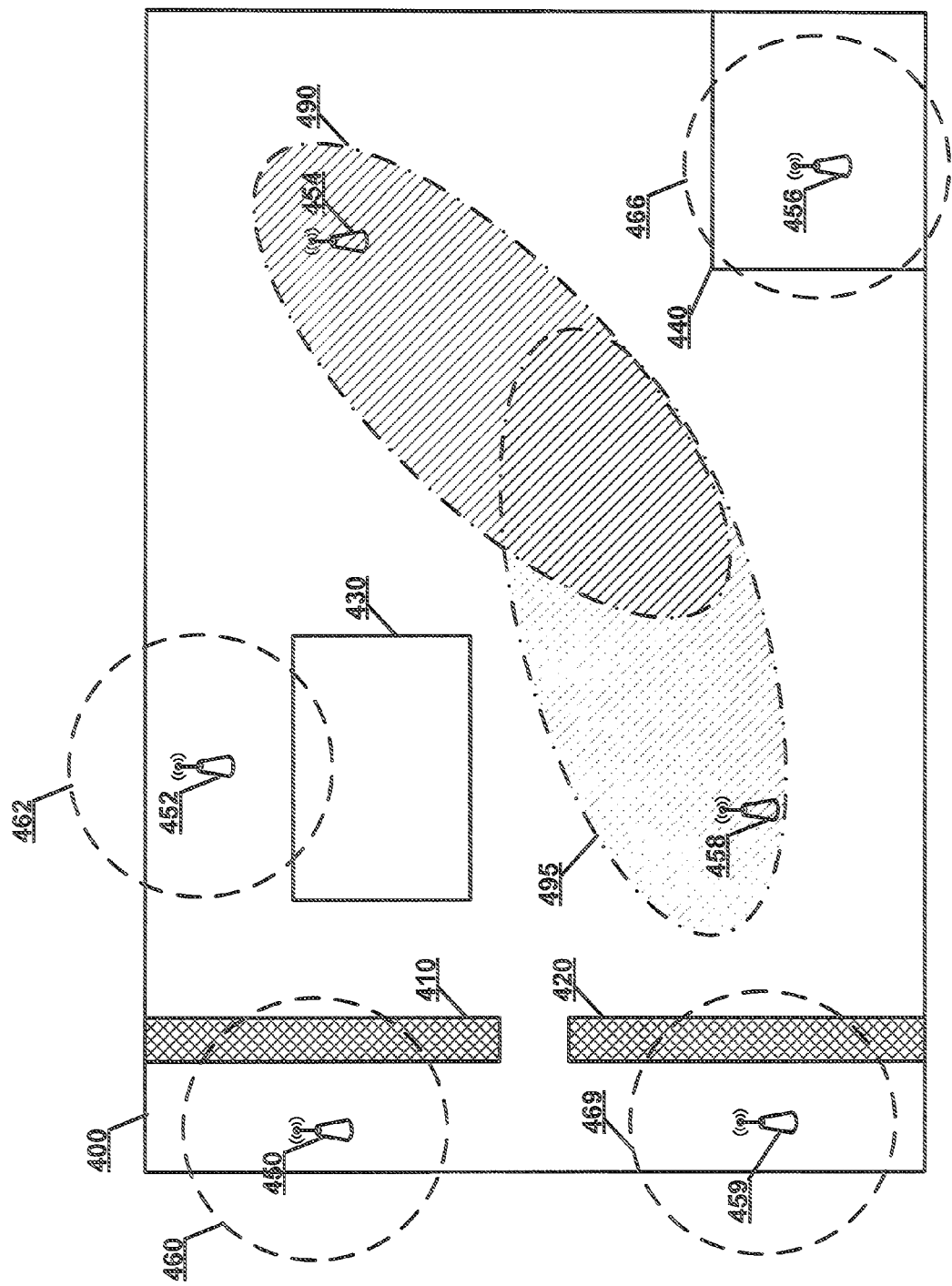
FIG. 4C shows exemplary adjusted radio coverage overlaid on a coverage area description according to embodiments of the present disclosure.

FIG. 4C shows exemplary adjusted radio coverage overlaid on the facility floor plan based on coverage objective illustrated in FIG. 4B. FIG. 4C includes a plurality of network devices, such as access point 450, access point 452, access point 454, access point 456, access point 458, and access point 459. For illustration purposes, assuming that, access point 450 has one or more antennas with a wireless coverage area encircled by area 460; access point 452 has one or more antennas with a wireless coverage area encircled by area 462; access point 456 has one or more antennas with a coverage area encircled by area 466; and, access point 459 has a wireless coverage area encircled by area 469, etc.

In order to improve the coverage for area 480 indicated in FIG. 4B, for example, antennas of access point 458 and access point 454 can dynamically switch or reshape their antenna radiated patterns to aim at the area that needs improved coverage. In this example, antennas of access point 454 are reshaped to cover area 490, and antennas of access point 458 are reshaped to cover area 495.

Note that, the decision to switch or reshape smart antenna patterns can be made dynamically. For example, assuming that the cause for lacking wireless coverage in area 480 as indicated in FIG. 4B is due to an unexpected downtime of an access point deployed within area 480. When the access point deployed within area 480 is powered up again, access point 454 and access point 458 can dynamically change back to their initial radiated patterns.

Furthermore, an overlapping parameter may be configured by a network administrator to indicate whether overlapping coverage from multiple access points are preferable. For example, if the overlapping parameter is configured to indicate that no overlapping coverage is desired, then the network device (e.g., the network controller) may coordinate only access point 458 (or access point 454 but not both) to switch or reshape its antenna pattern to cover area 480. On the other hand, if the overlapping parameter is configured to indicate that overlapping coverage is preferred, then the network device can coordinate two or more access points, such as access point 454 and access point 458, to switch or reshape their antenna patterns in order to provide the desired coverage for area 480. In some embodiments, the two or more access points can coordinate the switching or reshaping of their antenna patterns in a sequential and/or incremental manner. In other embodiments, the two or more access points can coordinate the switching or reshaping of their antenna patterns in a parallel and/or spontaneous manner. Moreover, the desired coverage can be indicated by a threshold minimum signal strength level configured by the network administrator.

As another example, assuming that a facility decides to deploy multiple access points for wireless LAN coverage in order to provide the necessary network coverage and capacity based on the wireless analysis. The available mounting locations include areas on the ceiling in a center area and around the perimeter walls. Furthermore, assuming that, the wireless radio antennas deployment design includes a down-tilt or squint omnidirectional pattern in the center area installation, and a 90-degree patch sector is desired to be utilized around the perimeter walls for security and improved coverage.

Conventionally, this could be implemented by using separate and different antenna types (e.g., squint pattern and directional patch) for the ceiling-mounted installations of access points and wall-mounted installations of access points. According to embodiments in the present disclosure, the same access point and adaptive antennas can be installed at all locations (both ceiling-mounted and wall-mounted installations). Each adaptive antenna can be configured to adopt a downtilt or squint omnidirectional pattern, or to adopt a 90-degree directional patch sector pattern.

The patterns can be managed in a coordinated manner from a centralized control-plane mechanism. The coordination can be accomplished either manually based on user input, or automatically by the control-plane mechanism based on an indicated coverage area and a corresponding coverage objective. In addition, the control-plane mechanism may also determine how to coordinate a plurality of smart antennas based on installation methods and/or wireless signal strength feedbacks.

Furthermore, in some embodiments, the control-plane mechanism can coordinate multiple individual smart antennas. In other embodiments, the control-plane mechanism can divide a plurality of smart antennas into multiple hierarchical groups, and coordinate the antenna radiated patterns across multiple groups or subgroups. The groups and/or subgroups of smart antennas may be at the same or different hierarchical levels.

Moreover, in some embodiments, the control-plane mechanism may coordinate adaptive antennas to adjust a horizontal antenna pattern. In other embodiments, the control-plane mechanism may coordinate adaptive antennas to adjust the vertical beam width and/or shape in order to reduce the amount of radiated signal in the vertical direction. For example, for a multi-story building, it may be desired to control the radiated pattern of the adaptive antennas to reduce the interference and to improve security between different floors of the building. In other embodiments, the control-plane mechanism may coordinate adaptive antennas to adjust antenna patterns in multiple directions, including the horizontal direction, the vertical direction, and/or any other angled direction.

The centralized control-plane mechanism disclosed in the present disclosure provides for coordinating antenna radiated patterns and/or shapes with an adaptive radio management, e.g., by adjusting power and frequency settings of adaptive radios, to adjust the size, the shape, and other parameters of each individual antenna pattern to collaboratively meet the overall coverage and security objectives.

Figure 5A:
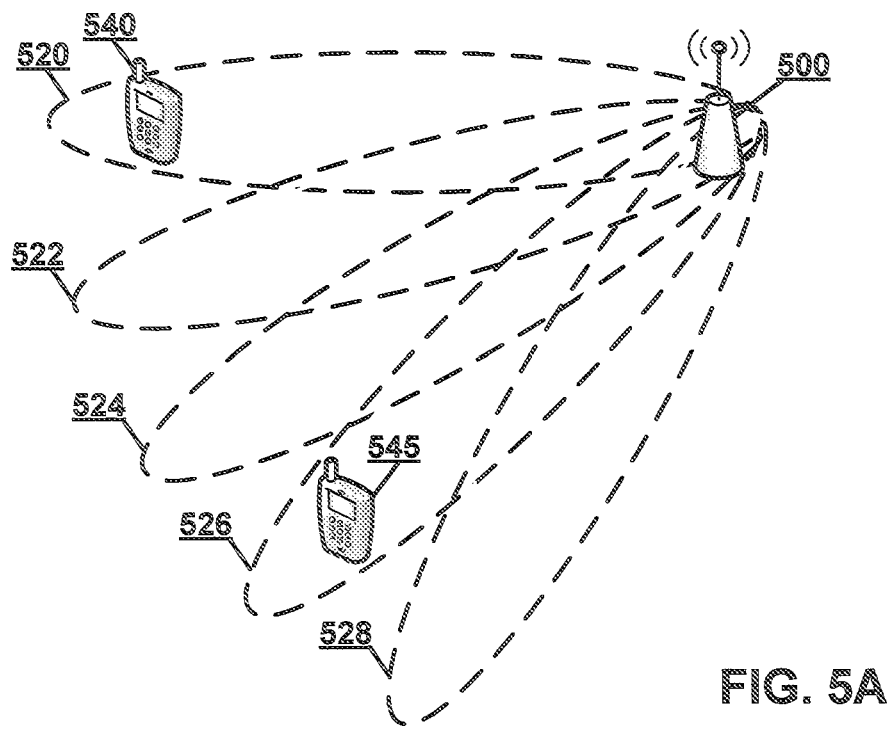
FIGS. 5A-5B shows scanning of various WLAN environments according to embodiments of the present disclosure.
Figure 5B:
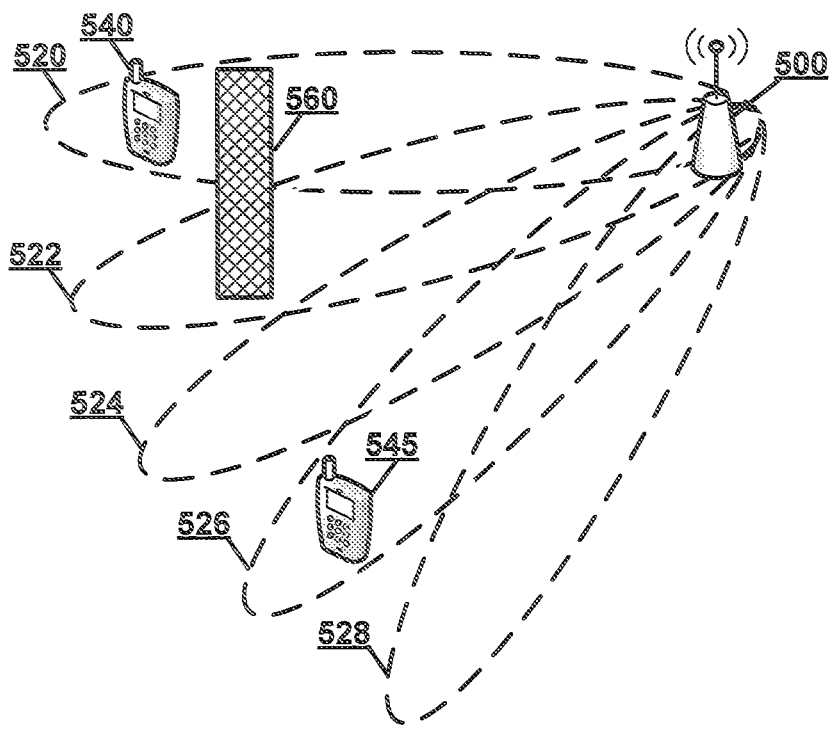

FIGS. 5A-5B shows scanning of various WLAN environments by managing adaptive antennas to characterize WLAN environments. FIGS. 5A-5B each illustrates access point 500 having an adaptive antenna and a plurality of wireless client devices such as wireless client device 540 and wireless client device 545 according to embodiments of the present disclosure. The control-plane mechanism may manage adaptive antenna to scan its WLAN environment in specified directions. Specifically, the control-plane mechanism may control radio scanning by notifying access point 500 to switch its antenna radiated patterns to aim at direction 520, direction 522, direction 524, direction 526, direction 528, etc. In this example, assuming that wireless client device 540 and wireless client device 545 are the same type of devices located at equal distance from access point 500.

In FIG. 5A, because there is no physical barrier existing in the WLAN environment, signal strengths received from wireless client device 540 and wireless client device 545 will likely to be comparable to each other, e.g., both signal strengths may be around 12 dB. In FIG. 5B, however, because of the existence of physical barrier 560 located between wireless client device 540 and access point 500, the signal strength received from wireless client device 540 may be much weaker than the signal strength received from wireless client device 545, e.g., the signal strength from wireless client device 540 may be around 5 dB, whereas the signal strength from wireless client device 545 may be around 12 dB. Therefore, managing adaptive antennas to scan or interrogate WLAN environments in a coordinated manner, the present disclosure may also provide a way to understand and characterize the WLAN environments. In the example illustrated in FIGS. 5A-5B, if access point 500 observes substantially weaker signals from wireless client device 540 than from wireless client device 545, the control-plane mechanism may determine that there could be a physical barrier or an interferer existing between wireless client device 540 and access point 500.

Process for Managing Adaptive Antenna Pattern in WLAN

Figure 6A:
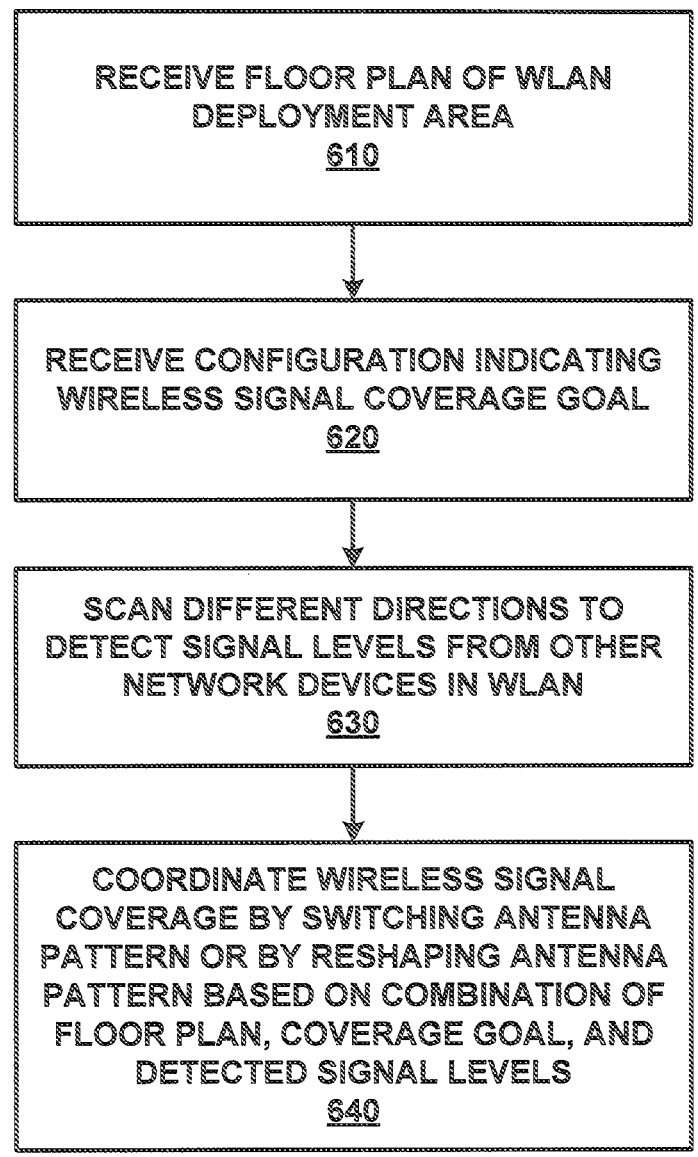
FIG. 6A is a flowchart illustrating processes for managing adaptive antenna patterns in a WLAN according to embodiments of the present disclosure.

FIG. 6A shows a process for managing adaptive antenna patterns in a WLAN according to embodiments of the present disclosure. During operations, a network device receives coverage area description, such as a floor plan, a map, or any other description of physical features of a wireless local area network deployment area (operation 610). In addition, the network device further receives a configuration, e.g. from a network administrator, indicating a wireless signal coverage objective (operation 620). For example, the wireless signal coverage objective may indicate an area desired for improved wireless coverage and/or a signal strength threshold level indicating the minimum signal strength desired within the area. Next, the network device may scan (or instruct another network device to scan) different directions to detect signal strength levels from other network devices in the WLAN (operation 630). Then, the network device can coordinate wireless signal coverage by switching antenna pattern of one or more access points or by reshaping antenna patterns based on the combination of the received coverage area description, the coverage objective, and the detected signal strength levels (operation 640).

Figure 6B:
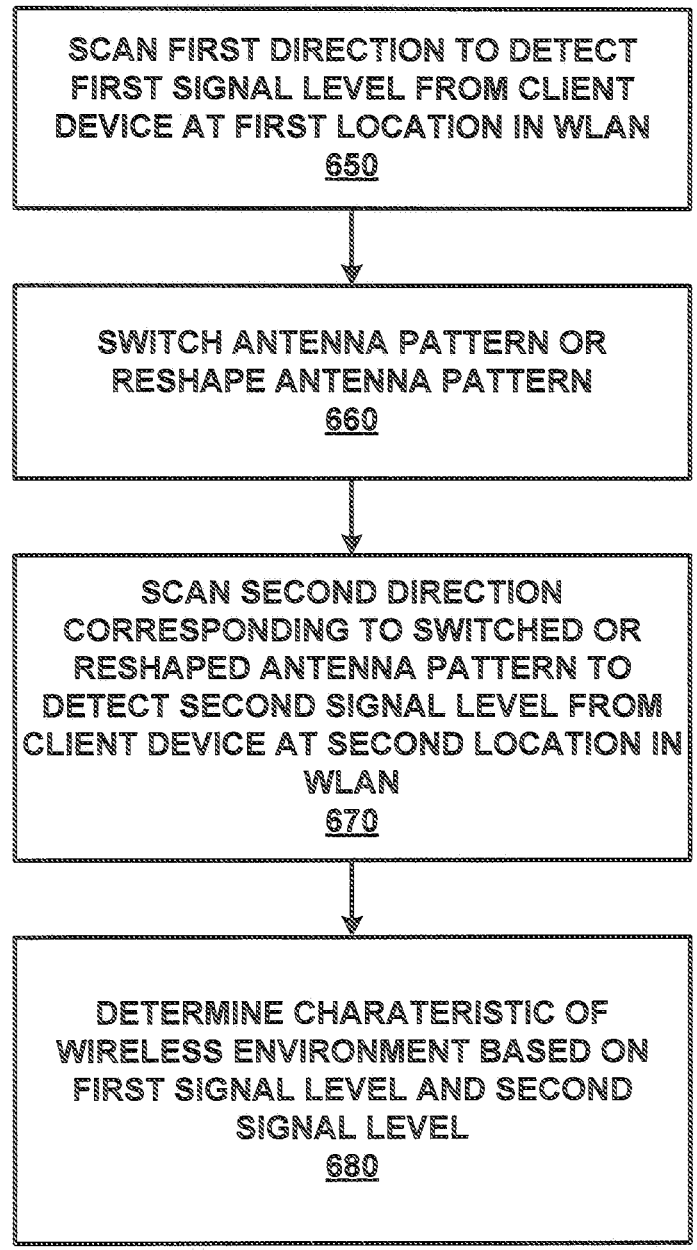
FIG. 6B is a flowchart illustrating processes for characterizing WLAN environment by managing adaptive antenna patterns according to embodiments of the present disclosure.

FIG. 6B shows a process for characterizing WLAN environment by managing adaptive antenna patterns according to embodiments of the present disclosure. During operations, a network device scans a first direction to detect a first signal level from a client device at a first location in the WLAN (operation 650). Subsequently, the network device switches its antenna pattern or reshapes its antenna pattern (operation 660). Next, the network device scans a second direction corresponding to the switched or reshaped antenna pattern to detect a second signal level from the client device at a second location in the WLAN (operation 670). Then, the network device can determine one or more characteristics of wireless environment based at least on the first signal level and the second signal level (operation 680). Note that, the network device can coordinate with multiple other network devices to switch and/or reshape their antenna radiated patterns, and determine the characteristics of the wireless environment based on parameters collected under multiple antenna radiated patterns from multiple network devices.

System for Adaptive Antenna Pattern Management in WLAN

Figure 7:
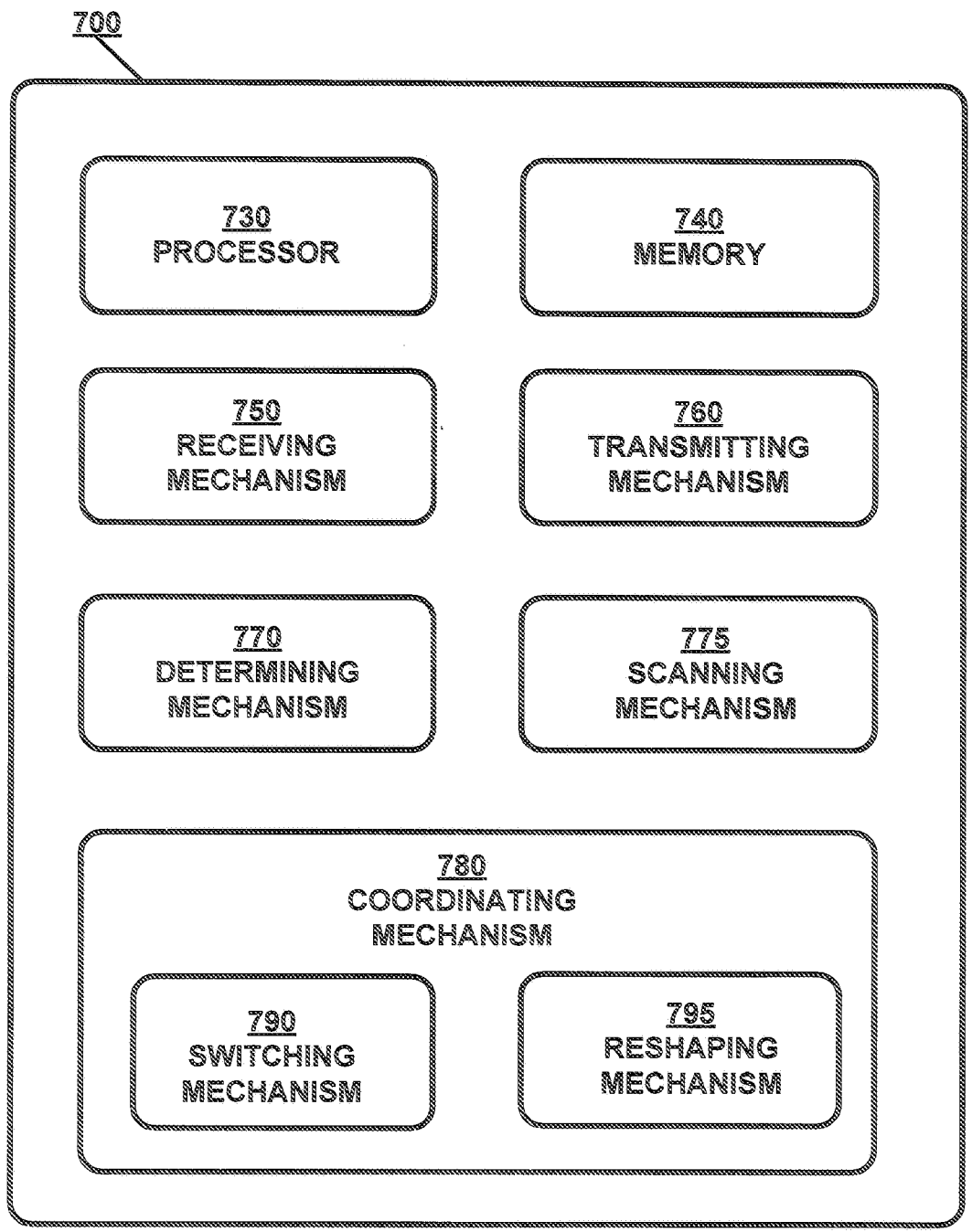
FIG. 7 is a block diagram illustrating a system for adaptive antenna pattern management in a WLAN according to embodiments of the present disclosure.

FIG. 7 is a block diagram illustrating a system for adaptive antenna management according to embodiments of the present disclosure.

Operating as a network device having an adaptive radio antenna, network device 700 includes at least a processor 730 capable of processing computing instructions, and a memory 740 capable of storing instructions and data. Moreover, network device 700 further includes a receiving mechanism 750, a transmitting mechanism 760, a determining mechanism 770, a scanning mechanism 775, and a coordinating mechanism 780, all of which are coupled to processor 730 and memory 740 in network device 700. Coordinating mechanism 780 also includes switching mechanism 790 and reshaping mechanism 795, both of which are coupled to processor 730 and memory 740 in network device 700. Network device 700 may be used as a client system, or a server system, or may serve both as a client and a server in a distributed or a cloud computing environment.

Processor 730 can include one or more microprocessors and/or network processors. Memory 740 can include storage components, such as, Dynamic Random Access Memory (DRAM), Static Random Access Memory (SRAM), etc.

Receiving mechanism 750 receives one or more radio signals via adaptive radio antenna from one or more wireless clients in the wireless network. The received radio signals may include, but are not limited to, request and/or response messages, beacon frames, management frames, control path frames, and so on. Each message or frame may comprise one or more data packets. In some embodiments, receiving mechanism 750 receives a facility floor plan and/or a wireless coverage objective for a wireless network. In other embodiments, receiving mechanism 750 receives a configuration. The configuration may include an overlapping parameter.

Transmitting mechanism 760 transmits radio signals, which include, but are not limited to, request and/or response messages, beacon frames, management frames, control path frames, and so on.

Determining mechanism 770, according to embodiments of the present disclosure, determines whether wireless coverage corresponding to a respective area meets the wireless coverage objective. Such determination can be made in response to scanning mechanism 775 scans a plurality of channels at a plurality of directions. In some embodiments, determining mechanism 770 determines one or more characteristics of the wireless network based on a first signal strength level and a second signal strength level. Such determination can be made in response to scanning mechanism 775 scans in a first direction to detect the first signal strength level and scans in a second direction to detect the second signal strength level.

Scanning mechanism 775 generally scans a plurality of channels in a plurality of directions to detect wireless signal strength levels from other devices in the wireless network. In some embodiments, scanning mechanism 775 scans in different directions to detect signal strength levels from other network devices in the wireless network. In other embodiments, scanning mechanism 775 may scan in different directions to detect signal strength levels from wireless client devices in the wireless network. For example, scanning mechanism 775 can scan in a first direction to detect a first signal strength level from a wireless client device at a first location in the wireless network. Moreover, in response to coordinating mechanism 780 coordinates the wireless signal coverage, scanning mechanism 775 can scan in a second direction corresponding to a changed antenna pattern to detect a second signal strength level from the wireless client device at a second location in the wireless network. Note that, the changed antenna pattern may include a switched new radiated antenna pattern, or a reshaped existing radiated antenna pattern.

Coordinating mechanism 780 generally coordinate wireless signal coverage with one or more other network devices in the wireless network based at least on a floor plan, a wireless coverage objective, and detected signal strength levels. In addition, coordinating mechanism 780 may further include, for example, switching mechanism 790 and reshaping mechanism 795. Switching mechanism 790 is adapted to switch the adaptive antenna pattern to a new radiated antenna pattern. For example, switching mechanism 790 can switch an omnidirectional radiation pattern to a directional patch section pattern. On the other hand, reshaping mechanism 795 is adapted to reshape an existing radiated antenna pattern to a different radiated antenna pattern, for example, by increasing or decreasing power settings and/or frequency settings.

Furthermore, coordinating mechanism 780 can collaborate with other mechanisms in coordinating the wireless signal coverage. For example, in response to determining mechanism 770 determines that the wireless coverage corresponding to a respective area does not meet the wireless coverage objective, coordinating mechanism 780 can coordinate the wireless signal coverage with one or more other network devices in the wireless network. As another example, when receiving mechanism 750 receives a configuration for an overlapping parameter, coordinating mechanism 780 coordinates with other network devices to provide overlapped wireless signal coverage if overlapping is configured by the overlapping parameter; and, coordinating mechanism 780 coordinates with other network devices to avoid overlapped wireless signal coverage if non-overlapping is configured by the overlapping parameter.

In some embodiments, coordinating mechanism 780 can coordinate wireless signal coverage based on one or more of: a user input, an indicated coverage area, a coverage objective, a wireless network device installation method, and/or a wireless signal strength level.

In some embodiments, multiple network devices in the wireless network may be divided into a plurality of groups and/or sub-groups at different hierarchical levels. In these embodiments, coordinating mechanism 780 may further coordinate antenna radiated patterns of adaptive radios on the multiple network devices across different groups or sub-groups at different hierarchical levels.

In some embodiments, coordinating mechanism is further adapted to coordinate radiated antenna patterns in a horizontal direction, a vertical direction, an angled direction, or any combination thereof.

Therefore, receiving mechanism 750, transmitting mechanism 760, determining mechanism 770, scanning mechanism 775, and coordinating mechanism 780, which includes switching mechanism 790 and reshaping mechanism 795, often collectively operate with each other to provide adaptive antenna pattern management in wireless local area networks.

According to embodiments of the present disclosure, network services provided by wireless network device 700, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
  receiving, by a network device comprising an adaptive antenna, a coverage area description and a wireless coverage objective for one or more wireless networks;
  scanning, by the network device, one or more channels at a plurality of directions to detect signal levels from one or more other network devices that together with the network device form the one or more wireless networks;
  identifying, by the network device, based on the scanning, a target area of the area in which the network device and the one or more other network devices are deployed for improving wireless signal coverage;
  coordinating, by the network device, wireless signal coverage over the area in which the network device and the one or more other network devices are deployed, with the one or more other network devices;
  determining, by the network device, that wireless coverage corresponding to the area in which the network device and the one or more other network devices are deployed does not meet the wireless coverage objective in response to scanning the one or more channels at the plurality of directions, wherein failing to meet the wireless coverage objective includes the network device and the one or more network devices jointly failing to provide wireless coverage to a specified portion of the area in which the network device and the one or more other network devices are deployed; and
  in response to determining that the wireless coverage corresponding to the area in which the network device and the one or more other network devices are deployed do not meet the wireless coverage objective, coordinating the wireless signal coverage over the area in which the network device and the one or more other network devices are deployed with the one or more other network devices in the one or more wireless networks.

2. The method of claim 1, wherein coordinating the wireless signal coverage over the area in which the network device and the one or more other network devices are deployed comprises one or more of:
  switching the adaptive antenna pattern; and
  reshaping the adaptive antenna pattern.

3. The method of claim 1, further comprising:
  receiving, by the network device, a configuration for an overlapping parameter;
  in response to overlapping being configured, coordinating, by the network device, with the other network devices in the one or more wireless networks to provide overlapped wireless signal coverage over the area in which the network device and the one or more other network devices are deployed; and
  in response to non-overlapping being configured, coordinating, by the network device, with the other network devices in the one or more wireless networks to avoid overlapped wireless signal coverage over the area in which the network device and the one or more other network devices are deployed.

4. The method of claim 1, wherein coordinating the wireless signal coverage is based on a wireless network device installation method.

5. The method of claim 1, wherein a plurality of network devices in the one or more wireless networks are divided into a plurality of groups, and further comprising:
coordinating, by the network device, antenna radiated patterns of adaptive radios on the plurality of network devices across the plurality of groups at different hierarchical levels.

6. The method of claim 1, wherein coordinating the wireless signal coverage further comprises coordinating radiated antenna patterns in a horizontal direction, a vertical direction, an angled direction, or a combination thereof.

7. The method of claim 1, wherein scanning the one or more channels at the plurality of directions comprises:
scanning, by the network device, in a first direction to detect a first signal strength level of a first wireless signal received from a wireless client device at a first location in the area in which the network device and the one or more other network devices are deployed;
in response to coordinating the wireless signal coverage, scanning in a second direction corresponding to a changed antenna pattern to detect a second signal strength level of a second wireless signal received from the wireless client device at a second location in the area in which the network device and the one or more other network devices are deployed;
comparing the first and second signal strength levels to determine existence of a physical barrier or an interferer; and
coordinating, by the network device, the wireless signal coverage over the area in which the network device and the one or more other network devices are deployed, with the one or more other network devices, based at least on the coverage area description, the wireless coverage objective, the detected signal levels, the identification of the target area, and the comparison of the first and second signal strength levels, by at least one of directing the signals towards the target area and away from the undesired coverage area to increase wireless signal coverage in the target area and to reduce signal interferences in the target area such that the network device and the one or more other network devices provide wireless network coverage for the one or more wireless networks in the area in which the network device and the one or more other network devices are deployed to meet the wireless coverage objective.

8. The method of claim 1, wherein scanning the one or more channels at the plurality of directions comprises:
scanning, by the network device, in a first direction to detect a first signal strength level of a first wireless signal received from a wireless client device at a first location in the area in which the network device and the one or more other network devices are deployed; and
in response to coordinating the wireless signal coverage, scanning in a second direction corresponding to a changed antenna pattern to detect a second signal strength level of a second wireless signal received from the wireless client device at a second location in the area in which the network device and the one or more other network devices are deployed, wherein the changed antenna pattern comprises a reshaped existing radiated antenna pattern, and wherein the reshaped existing radiated antenna pattern is formed by a coordinated change in an existing radiated antenna pattern for the network device and an existing radiated antenna pattern for the one or more other network devices.

9. The method of claim 7, further comprising:
determining, by the network device, one or more characteristics of the area in which the network device and the one or more other network devices are deployed based on the first signal strength level and the second signal strength level.

10. A network device comprising an adaptive antenna, the network device comprising:
a processor;
a memory unit;
a receiving mechanism operating with the processor, the receiving mechanism to receive a coverage area description and a wireless coverage objective for one or more wireless networks;
a scanning mechanism operating with the processor, the scanning mechanism to scan one or more channels at a plurality of directions to detect signal levels from one or more other network devices in the one or more wireless networks;
a coordinating mechanism operating with the processor, the coordinating mechanism to:
identify, based on the scanning, a target area of the area in which the network device and the one or more other network devices are deployed for improving wireless signal coverage based on
active antenna radiated patterns for the network device and the one or more other network devices; and
the wireless coverage objective for the one or more wireless networks; and
coordinate wireless signal coverage over the area in which the network device and the one or more other network devices are deployed, with the one or more other network devices; and
a determining mechanism coupled to the processor, the determining mechanism to determine that wireless coverage corresponding to the area in which the network device and the one or more other network devices are deployed does not meet the wireless coverage objective in response to scanning the one or more channels at the plurality of directions, wherein failing to meet the wireless coverage objective includes the network device and the one or more network devices jointly failing to provide wireless coverage to a specified portion of the area in which the network device and the one or more other network devices are deployed,
wherein the coordinating mechanism to coordinate the wireless signal coverage over the area in which the network device and the one or more other network devices are deployed with the one or more other network devices in the one or more wireless networks in response to determining that the wireless coverage corresponding to the area in which the network device and the one or more other network devices are deployed not meeting the wireless coverage objective.

11. The network device of claim 10, wherein the coordinating mechanism comprises:
a switching mechanism adapted to switch the adaptive antenna pattern; and
a reshaping mechanism adapted to reshape the adaptive antenna pattern.

12. The network device of claim 10, wherein the receiving mechanism further to receive a configuration for an overlapping parameter;

wherein, in response to overlapping being configured by the overlapping parameter, the coordinating mechanism to coordinate with the other network devices in the one or more wireless networks to provide overlapped wireless signal coverage over the area in which the network device and the one or more other network devices are deployed; and wherein, in response to non-overlapping being configured by the overlapping parameter, the coordinating mechanism to coordinate with the other network devices in the one or more wireless networks to avoid overlapped wireless signal coverage over the area in which the network device and the one or more other network devices are deployed.

13. The network device of claim 10, wherein the coordinating mechanism coordinates the wireless signal coverage based on a coverage objective direction.

14. The network device of claim 10, wherein a plurality of network devices in the one or more wireless networks are divided into a plurality of groups; and wherein the coordinating mechanism further coordinates antenna radiated patterns of adaptive radios on the plurality of network devices across the plurality of groups at different hierarchical levels.

15. The network device of claim 10, wherein the coordinating mechanism is further adapted to coordinate radiated antenna patterns in a horizontal direction, a vertical direction, an angled direction, or a combination thereof.

16. The network device of claim 10, wherein the scanning mechanism further to scan in a first direction to detect a first signal strength level of a first wireless signal received from a wireless client device at a first location in the area in which the network device and the one or more other network devices are deployed;

wherein, in response to the coordinating mechanism coordinating the wireless signal coverage, the scanning mechanism further to scan in a second direction corresponding to a changed antenna pattern to detect a second signal strength level of a second wireless signal received from the wireless client device at a second location in the area in which the network device and the one or more other network devices are deployed; and wherein the coordinating mechanism to compare the first and second signal strength levels to determine existence of a physical barrier or an interferer, and coordinate the wireless signal coverage over the area in which the network device and the one or more other network devices are deployed, with the one or more other network devices, based at least on the coverage area description, the wireless coverage objective, the detected signal levels, the identification of the target area, and the comparison of the first and second signal strength levels, by at least one of directing the signals towards the target area and away from the undesired coverage area to increase wireless signal coverage in the target area and to reduce signal interferences in the target area such that together the network device and the one or more other network devices provide wireless network coverage for the one or more wireless networks in the area in which the network device and the one or more other network devices are deployed to meet the wireless coverage objective.

17. The network device of claim 10, wherein the scanning mechanism further to scan in a first direction to detect a first signal strength level of a first wireless signal received from a wireless client device at a first location in the area in which the network device and the one or more other network devices are deployed;

wherein, in response to the coordinating mechanism coordinating the wireless signal coverage, the scanning mechanism further to scan in a second direction corresponding to a changed antenna pattern to detect a second signal strength level of a second wireless signal received from the wireless client device at a second location in the area in which the network device and the one or more other network devices are deployed, wherein the changed antenna pattern comprises a reshaped existing radiated antenna pattern, and wherein the reshaped existing radiated antenna pattern is formed by a coordinated change in an existing radiated antenna pattern for the network device and an existing radiated antenna pattern for the one or more other network devices.

18. The network device of claim 16, further comprising:

a determining mechanism operating with the processor, the determining mechanism to determine one or more characteristics of the area in which the network device and the one or more other network devices are deployed based on the first signal strength level and the second signal strength level.

19. A non-transitory computer-readable storage medium storing embedded instructions that are executed by one or more mechanisms implemented within a network device comprising an adaptive antenna to perform a plurality of operations which when executed by the network device cause the network device to:

analyze a coverage area description and a wireless coverage objective for a wireless network scan one or more channels at a plurality of directions to detect signal levels from one or more other network devices in the wireless network;

identify, based on the scanning, a target area of the area in which the network device and the one or more other network devices are deployed for improving wireless signal coverage;

coordinate wireless signal coverage over the area in which the network device and the one or more other network devices are deployed with the one or more other network devices;

determine, by the network device, that wireless coverage corresponding to the area in which the network device and the one or more other network devices are deployed does not meet the wireless coverage objective in response to scanning the one or more channels at the plurality of directions, wherein failing to meet the wireless coverage objective includes the network device and the one or more network devices jointly failing to provide wireless coverage to a specified portion of the area in which the network device and the one or more other network devices are deployed; and in response to the determination that the wireless coverage corresponding to the area in which the network device and the one or more other network devices are deployed do not meet the wireless coverage objective, coordinate the wireless signal coverage over the area in which the network device and the one or more other network devices are deployed with the one or more other network devices in the one or more wireless networks.

* * * * *